United States Patent [19]
Kondo et al.

[11] 3,915,801
[45] Oct. 28, 1975

[54] PROCESS FOR PREPARING 6-AMINOPENICILLANIC ACID

[75] Inventors: Eiji Kondo, Ikeda; Takashi Mitsugi, Takaishi; Takashi Matsushima, Kobe, all of Japan

[73] Assignee: Shionogi & Co., Ltd., Osaka, Japan

[22] Filed: May 22, 1974

[21] Appl. No.: 473,162

[30] Foreign Application Priority Data
May 30, 1973 Japan.................................. 48-60594

[52] U.S. Cl. ................................. 195/36 P; 195/81
[51] Int. Cl.² ........................................... C12D 9/06
[58] Field of Search.................................... 195/36 P

[56] References Cited
UNITED STATES PATENTS

| | | | |
|---|---|---|---|
| 3,272,715 | 9/1966 | Grant et al. | 195/36 P |
| 3,616,223 | 10/1971 | Weiner | 195/36 P |

*Primary Examiner*—Alvin E. Tanenholtz
*Attorney, Agent, or Firm*—Wenderoth, Lind & Ponack

[57] ABSTRACT

6-Aminopenicillanic acid or its salt is prepared from a penicillin or its salt by the action of a fungus belonging to the genus Pseudofusarium or its mycelium preparation.

9 Claims, No Drawings

PROCESS FOR PREPARING 6-AMINOPENICILLANIC ACID

This invention relates to a process for the preparation of 6-aminopenicillanic acid or its salt, a well-known starting material for the synthesis of synthetic penicillins and cephalosporins, from a penicillin or its salt by the action of a penicillin amidase-producing fungus belonging to the genus Pseudofusarium or its mycelium preparation.

According to the process of this invention, a penicillin or its salt is subjected to the action of a fungus belonging to the genus Pseudofusarium or its mycelium preparation, and the produced 6-aminopenicillanic acid or its salt is separated and isolated in crude or pure state.

The said penicillin utilizable as a substrate for this invention can be penicillin V or like penicillins.

The salt can be a water-soluble salt (e.g. alkali metal salt or optionally alkylated ammonium salt) which does not interfere with the reaction of this invention.

The fungus for the preparation of 6-aminopenicillanic acid or its salt from a penicillin or its salt belongs to the genus Pseudofusarium. Specific fungi possessing the said penicillin amidase activity are exemplified by the following:

The genus Pseudofusarium is a genus discussed for the first time in an article written by Matsushima, T. (Matsushima, T., 1971; Microfungi of the Solomon Islands and Papua-New Guinea, page 47 );

A species Pseudofusarium fusarioideum is a species discussed for the first time in the article written by Matsushima, T. *Pseudofusarium fusarioideum* MFC-141 has been isolated from the soil collected at Tsu city in Mie prefecture, Japan on September 1964, and shows the following morphological characteristics. The growth on potato-sucrose agar is spreading, and the colony is white and powdery. Conidiophore is irregularly branched, and the end of branches elongate sympodially. The conidiophore bears only one spore at each proliferation. The spore is colorless, spindle form, mainly somewhat curved, and is about 20 to 50 by 4 to 6.5 microns in size. The spore has 1 to 9, mainly 5 septa. From these morphological characteristics, it is concluded that the said strain belongs to the same species with *Pseudofusarium fusarioideum* Matsushima described in the said article, and the microorganism is designated as above, and is deposited with the American Type Culture Collection under the accession number ATCC 20375; and Other species of the said genus possessing the said penicillin amidase activity.

The use of natural or artificial mutants or variants possessing the said penicillin amidase activity and belonging to the said genus is also included in the scope of this invention. The artificial mutant can be produced by such a conventional method as X-ray irradiation, ultra-violet irradiation, chemical mutation (e.g. with nitrogen mustard), and the like.

The fungus can be inoculated and propagated in a natural or artificial nutrient medium suitable for the propagation of the fungus. Representative media contain the following ingredients: such nitrogen or carbon sources as a carbohydrate (e.g. glucose, fructose, maltose, sucrose, starch, starch hydrolyzate, sorbitol, honey, potato powder, flour), bouillon, yeast extract, peptone, corn steep liquor, fish meal, fish meal extract, casein hydrolyzate, soy bean meal, casamino acid, rice bran extract, urea, ammonia, ammonium salt (e.g. chloride, sulfate, nitrate, acetate, phosphate), organic acid (e.g. acetic acid, lactic acid), and like sources; inorganic salt (e.g. magnesium sulfate, sodium phosphate, iron sulfate, manganese chloride, copper chloride, zinc chloride); and/or other materials necessary or preferable for the growth of fungi (e.g. fungal vitamine, amino acid). The propagation is carried out preferably under aerobic condition (e.g. by shaking or static culture, culture under aeration or stirring), and preferably at pH 5 to 9, at 20° to 40°C, for 1 to 5 days to give desired mycelium or propagated fungus. The propagation can be carried out in the presence of a penicillin for induction of the penicillin amidase.

The action of the fungus belonging to said genus is effected by contacting the penicillin or its salt in the form of a powder, suspension or solution in aqueous or hydrophilic organic solvent with the fungus or its mycelium preparation in aqueous medium.

The fungus can be the propagated fungus in the broth; mycelium or propagated fungus collected and washed with water or buffer solution to remove nutrient solution and other contaminants; or dried mycelium obtained by drying the mycelium with a water soluble organic solvent (e.g. acetone, ethanol).

The said mycelium preparation is that which is available for utilization of the penicillinamidase activity of intra- or extra-cellular enzyme system of the fungus. The preparation can be, for example, the propagated culture broth, mycelium or fungus, culture broth from which the fungus is removed, or enzyme solution. The enzyme solution includes crude enzyme solution containing homogenate of mycelium obtained by homogenating said fungus; crude or purified enzyme obtained by a conventional method in the art from the said mycelium homogenate [by e.g. salting out (with e.g. ammonium sulfate), dialysis, precipitation (with e.g. acetone, ethanol), chromatography, gel filtration, centrifugation, electrophoresis, and like methods]; and the fungus or crude or purified enzyme combined with solid material (e.g. Cephadex, DEAE-cellulose, Celite, active charcoal, ion-exchange resin) to form a solid enzyme preparation.

The hydrophilic organic solvent (e.g. alcohol, acetone) is used at a concentration which does not inhibit the action of said penicillin amidase. The aqueous medium includes distilled water, buffer solution, salt solution, and the nutrient medium used for propagation, or like medium. Aerobic condition is not essential, but preferable. Shaking and stirring are preferable. Preferable conditions are pH 5 to 8, at 20° to 40°C, and for 5 to 80 hours, although these values change depending on the sort and concentration of the starting materials and fungus, procedure for the treatment, and other conditions. If necessary, acid, base, or buffer solution can be added for adjusting the pH of the medium during reaction. Preferable concentration of the starting penicillin is 0.1 to 20%, more preferably 0.1 to 10%.

Isolation and purification of the produced 6-aminopenicillanic acid or its salt can be effected by a conventional method in the art [e.g. separation of the fungi, mycelium preparation or insoluble material from the reaction mixture (by means of e.g. filtration, centrifugation, absorption, denaturation, etc., or the combination of these); followed by isolation (by means of e.g. absorption, fractional extraction, concentration, separation, precipitation, or other methods); and by purification (by means of e.g. recrystallization, absorption, chromatography, ion-exchange, or other conventional methods in the art)]. The product, 6-aminopenicillanic acid, can be isolated as a salt at the carboxy group (e.g. sodium, potassium, magnesium, amine salts); or as a salt at the produced amino group (e.g. p-toluenesulfonate, rhodanate, hydrochloride, sulfate).

In this specification, MFC for the strain number denotes the collection numbers of the Shionogi Research Laboratory.

The following examples represent presently preferred embodiments of this invention, but it is to be understood that the examples are given by way of illustration only and are not limitive of the invention.

EXAMPLE 1

*Pseudofusarium fusarioideum* MFC-141 (ATCC 20375) is inoculated in a sterilized nutrient medium (900 ml) consisting of aqueous solution (pH 7.0) containing glucose (3.5%), peptone (2.0%), and corn steep liquor (0.3%), and cultured with shaking at 28°C for 3 days. The broth is filtered to give mycelium, which is washed with de-ionated water.

The mycelium (ca. 49.5 g) is suspended in de-ionated water (900 ml) containing penicillin V potassium salt (5.4 g), and the suspension is shaken for 24 hours. The suspension is then filtered to remove mycelium, acidified with 4N-sulfuric acid to pH 2, and washed with three equal volumes of n-butyl acetate. Washed aqueous solution is adjusted to pH 7.0 with barium hydroxide, and centrifuged. Concentration of the supernatant to 70 ml at a temperature not higher than 38°C, followed by addition of methanol (140 ml) gives precipitation, and the precipitate is removed by filtration. The filtrate is concentrated to 30 ml, acidified with 6N-hydrochloric acid to pH 4.3, and stored at 4°C overnight. Collection of formed crystals by filtration, washing with water, and drying gives 6-aminopenicillanic acid (1.55 g). m.p. 202°–205°C (decomposition). IR: $\nu_{max}^{Nujol}$ 1771, 1623, 1411, 1337, 1254, 767 cm$^{-1}$. Elemental analysis of the product is in good agreement with the values calculated for $C_8H_{12}N_2SO_3$ ⅓ $H_2O$. Yield: 52%.

EXAMPLE 2

A suspension of the mycelium (5.4 g) obtained by the method of Example 1 in de-ionated water (100 ml) containing penicillin V potassium salt (1 g) is shaken for 45 hours, and the mixture is filtered to remove the mycelium. The filtrate contained 0.38 g/100 ml of 6-aminopenicillanic acid when determined by the method of G. E. Boxer et al. (Anal. Chem., 21, 670 (1949)). Yield: 68%.

EXAMPLE 3

A suspension of the mycelium (5.4 g) obtained by the method of Example 1 in M/30 phosphate buffer (pH 7.0; 100 ml), containing penicillin V potassium salt (1.5 g), is shaken for 45 hours, and the mixture is filtered to remove the mycelium. The filtrate contained 6-aminopenicillanic acid (0.64 g/100 ml). Yeild: 77%.

EXAMPLE 4

To a broth (100 ml) containing propagated mycelium obtained by the method of Example 1 is added powdered penicillin V potassium salt (0.5 g), and the mixture is shaken for 24 hours, maintaining its pH at 7.0, to give 6-aminopenicillanic acid (0.20 g/100 ml). Yield: 72%.

EXAMPLE 5

To the nutrient medium of Example 1 is added 0.01% penicillin V potassium salt, and the medium is inoculated by *Pseudofusarium fusarioideum* MFC-141 and propagated. The mycelium thus obtained is allowed to act on penicillin V potassium salt by the method of Example 3 to give 6-aminopenicillanic acid (0.65 g/100 ml). Yield: 78%.

EXAMPLE 6

*Pseudofusarium fusarioideum* MFC-141 is inoculated in a sterilized nutrient medium (400 ml) consisting of aqueous solution (pH 7.0) containing glucose (3.5%), peptone (2.0%), and corn steep liquor (0.3%), and cultured with shaking at 28°C for 3 days. The broth is filtered to give mycelium, which is washed with water.

Penicillin V (7.0 g) is dissolved in 0.05N-aqueous sodium carbonate solution (400 ml), and the solution is adjusted to pH 7.5. To this solution is added the mycelium, and the mixture is stirred for 20 hours at 30°C. The mixture is filtered to remove mycelium, acidified with 4N-sulfuric acid to pH 2, and extracted with ethyl acetate to remove produced phenoxyacetic acid. Aqueous layer is neutralized with 4N-sodium hydroxide to pH 7.0, and concentrated to 30 ml. The concentrate is made pH 4.3 with 4N-sulfuric acid, and kept at 0°C overnight. Collection of the formed crystals by filtration, washing, and drying give 6-amino-penicillanic acid (3.15 g), m.p. 207°–208°C (decomposition). Yield: 75%.

What we claim is:

1. A process for the preparation of 6-aminopenicillanic acid or its salt which comprise subjecting a penicillin or its salt to the action of a fungus belonging to genus Pseudofusarium or its mycelium preparation in an aqueous medium, and isolating the resulting 6-aminopenicillanic acid or its salt in pure or crude state.

2. A process according to claim 1, wherein the action is effected in a medium selected from the group consisting of de-ionated water, phosphate buffer, and culture broth.

3. A process according to claim 1, wherein the action is effected at a pH between 5 and 8.

4. A process according to claim 1, wherein the action is effected at a temperature between 20° and 40°C.

5. A process according to claim 1, wherein the concentration of the penicillin or its salt in the aqueous medium is in the range from 0.1 to 10%.

6. A process according to claim 1, wherein the penicillin is penicillin V.

7. A process according to claim 1, wherein the penicillin salt is penicillin V alkali metal salt.

8. A process according to claim 1, wherein the fungus is *Pseudofusarium fusarioideum* MFC-141 (ATCC 20375).

9. A process according to claim 1, wherein the mycelium preparation is washed mycelium.

* * * * *